United States Patent
Travers et al.

Patent Number: 5,578,196
Date of Patent: Nov. 26, 1996

[54] PROCESS FOR REDUCING THE BENZENE CONTENT OF PETROLS

[75] Inventors: Christine Travers, Rueil Malmaison; Philippe Courty, Houilles; Patrick Sarrazin, Rueil Malmaison, all of France

[73] Assignee: Institut Francais du Petrole, Rueil-Malmaison, France

[21] Appl. No.: 365,927

[22] Filed: Dec. 29, 1994

[30] Foreign Application Priority Data

Dec. 29, 1993 [FR] France ................... 93 15954

[51] Int. Cl.$^6$ .................... C10G 45/00; C07C 5/13
[52] U.S. Cl. .................... 208/57; 208/139; 585/253; 585/734; 585/747; 585/748; 585/750; 585/751
[58] Field of Search .................... 585/253, 734, 585/747, 748, 750, 751; 208/139, 57

[56] References Cited

U.S. PATENT DOCUMENTS

| | | | |
|---|---|---|---|
| 3,025,248 | 3/1962 | Oleck et al. | 502/334 |
| 3,173,856 | 3/1965 | Burton et al. | 208/138 |
| 3,903,192 | 9/1975 | Torck et al. | 585/374 |
| 5,003,118 | 3/1991 | Low et al. | 585/253 |

FOREIGN PATENT DOCUMENTS

| | | |
|---|---|---|
| 0552070 | 7/1993 | European Pat. Off. . |
| 1220868 | 5/1960 | France . |
| 2133611 | 12/1972 | France . |
| WO92/20759 | 11/1992 | WIPO . |

*Primary Examiner*—Asok Pal
*Assistant Examiner*—Walter D. Griffin
*Attorney, Agent, or Firm*—Millen, White, Zelano, & Branigan, P.C.

[57] ABSTRACT

The invention concerns a process for reducing the benzene content of petrol fractions, in which hydrogenation is carried out on a feed with the following composition by weight: 40% to 80% of paraffins, 0.5% to 7% of cyclic hydrocarbons and 6% to 45% of aromatics, and with a maximum distillation temperature of between 70° C. and 90° C., followed by isomerisation of the effluent from the hydrogenation step, mixing said feed and/or said effluent with a $C_5$–$C_6$ cut; said process being characterised in that an isomerisation catalyst is used which contains chlorine and at least one group VIII metal deposited on a support composed of a mixture of specific proportions of eta alumina and gamma alumina.

10 Claims, 1 Drawing Sheet

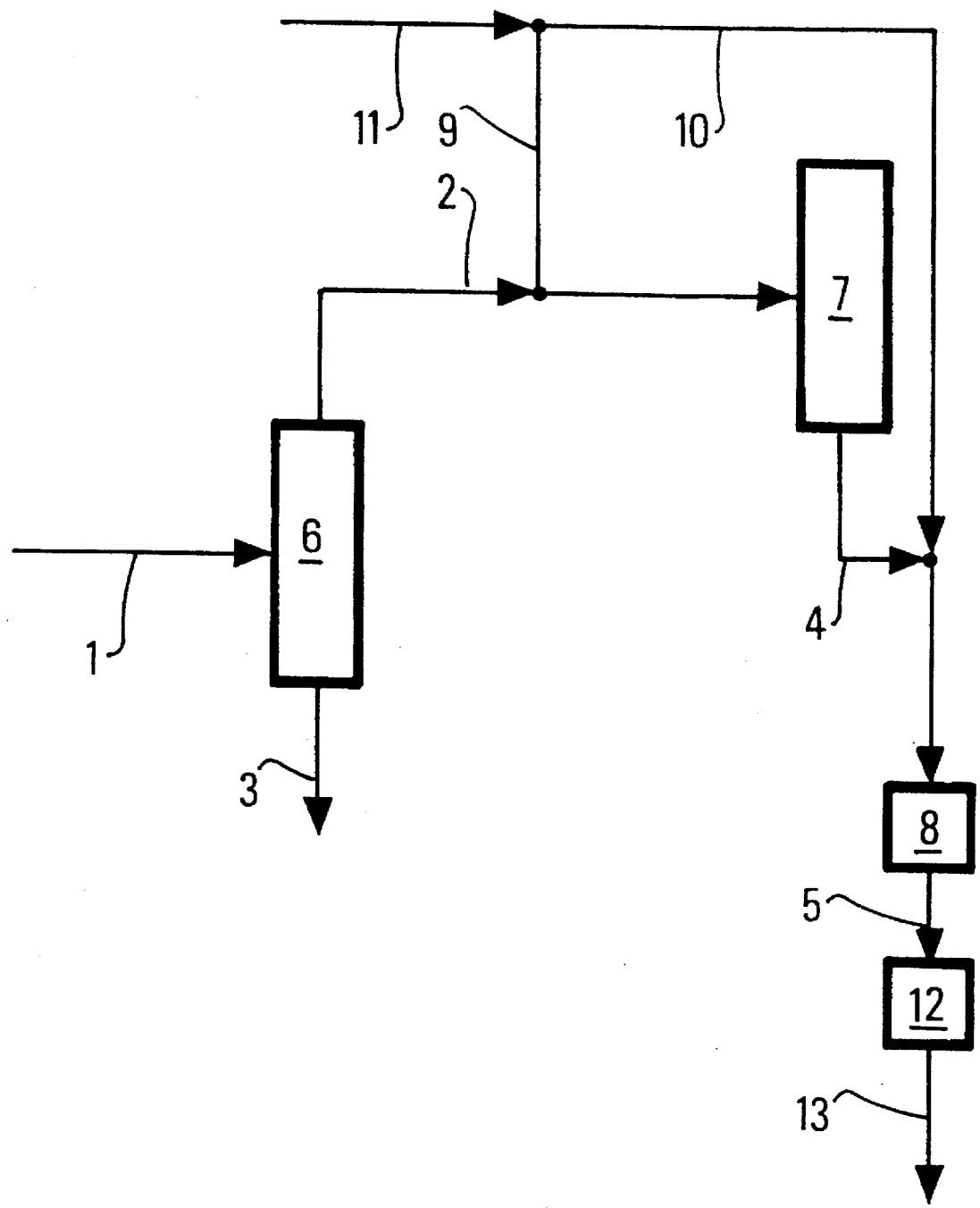

PROCESS FOR REDUCING THE BENZENE CONTENT OF PETROLS

BACKGROUND OF THE INVENTION

The invention concerns a process for reducing the benzene content of petrol (gasoline) fractions. In the context of the present invention, these petrol fractions are preferably and generally mixtures of light reformate and a straight run $C_5$–$C_6$ cut. Said process combines hydrogenation of a feed such as the light reformate and optional hydrogenation of a $C_5$–$C_6$ cut with isomerisation of the effluent from hydrogenation and optional isomerisation of said cut. The process is characterised in that the isomerisation reaction is carried out using a particular catalyst which contains chlorine and at least one metal from group VIII deposited on a support constituted by a mixture of specific proportions of eta alumina and gamma alumina.

Environmental problems have led to a joint reduction in the lead content and the benzene content in petrol fractions, preferably without reducing the octane number. Catalytic reforming under very severe conditions and isomerisation of normal $C_5$–$C_6$ paraffins with a low octane number are currently the most frequently used processes for producing high octane numbers without adding lead. However, catalytic reforming produces large quantities of benzene with a high octane number. Thus it is necessary to develop new processes which can reduce the benzene content in a petrol while complying with octane number specifications.

The combination of catalytic reforming and isomerisation, consisting in separating the $C_5$–$C_6$ fraction from the reformate, isomerising it and introducing it directly into petrol fractions to improve the octane number, are well known: this is, for example, described in U.S. Pat. Nos. 4,457,832, 4,181,599 and 3,761,392. Isomerisation of the $C_5$–$C_6$ cut from a straight run crude is also well known. The octane number of the cut is considerably improved. The benzene content of the reformate can be reduced in different ways, such as modifying the naphtha cut point between reforming and isomerisation or separating the reformate into two fractions: a heavy fraction (heavy reformate) and a light fraction (light reformate), all the benzene being concentrated in said light fraction. The light fraction is then sent to a hydrogenation unit which transforms the benzene into cyclic hydrocarbons which are then ring opened in an isomerisation unit working under severe conditions. The normal paraffins formed are isomerised using a conventional isomerisation process (U.S. Pat. No. 5,003,118).

European patent application EP-A-0 552 070 concerns a process comprising hydrogenation of a feed with the following composition by weight: 40% to 80% of paraffins, 0.5% to 7% of cyclic hydrocarbons and 6% to 45% of aromatics. The process is characterised in that the maximum distillation temperature is between 70° C. and 90° C. and in that the hydrogenation effluent is isomerised in an isomerisation step, said charge and/or said effluent being mixed with a $C_5$–$C_6$ cut.

SUMMARY OF THE INVENTION

We have shown that when a process such as that described in EP-A 0 552 070 employs a mixture of specific proportions of eta alumina and gamma alumina as an isomerisation catalyst support, said catalyst also containing at least one group VIII metal and at least one halogen, preferably chlorine, the isomerisation performance surprisingly improves and the stability increases. This mixture is such that the eta alumina content in the support is between 85% and 95% by weight, preferably between 88% and 92% by weight, more preferably between 89% and 91% by weight, the complement to 100% of the support being constituted by gamma alumina.

The process of the present invention thus comprises hydrogenation, in a hydrogenation zone, of the feed which will be defined below, then isomerisation, in an isomerisation zone, of the effluent from the hydrogenation step, mixing said feed and/or said effluent with a $C_5$–$C_6$ cut, said process being characterised in that a particular isomerisation catalyst is used. Joint treatment in this zone of the hydrogenated feed and a $C_5$–$C_6$ cut, at least a portion of which may have been hydrogenated, produces an effluent which is almost completely free of benzene (i.e., containing less than 0.1% by weight of benzene) and has a research octane number which is greater than or equal to the research octane number of the light reformate and allows the effluent to be incorporated directly into petrol fractions after stabilisation.

The process of the present invention is thus an improvement to the process described in European patent application EP-A-0 552 070, and is characterised in that the isomerisation catalyst comprises a particular support which is a mixture of specific proportions of eta alumina and gamma alumina.

The hydrogenation zone and the isomerisation zone of the invention may be contained in the same reactor (superimposed beds), or in separate reactors such that each zone is contained in at least one reactor. The conditions (including the operating conditions) under which hydrogenation and isomerisation are carried out are known to the skilled person, but will nevertheless be described below.

The feeds used in the present invention are generally as follows:

Hydrogenation zone feed

A light reformate fraction (or any equivalent fraction) may be mixed with a $C_5$–$C_6$ cut which normally comes from straight run distillation.

Isomerisation zone feed

The effluent from the hydrogenation zone is mixed with a $C_5$–$C_6$ cut which normally comes from straight run distillation, at least a portion of which may have been treated in the hydrogenation zone, as will be described below.

The light reformate fraction is obtained by distilling the reformate. It is defined by a maximum distillation temperature of between 70° C. and 90° C., preferably between 77° C. and 83° C., and the following composition by weight: 40% to 80% of paraffins, 0.5% to 7% of cyclic hydrocarbons (such as cyclopentane, methylcyclopentane and cyclohexane), and 6% to 45% of aromatics. The distillation temperature is generally between room temperature and the maximum distillation temperature (or overhead temperature).

Benzene is generally substantially the only aromatic compound in the fraction.

The fraction may also contain 1% to 3% of olefinic hydrocarbons.

The light reformate fraction described above generally has the following properties:

an average molecular weight of between 70 and 90 g/mole, a density of between 0.670 and 0.780 g/cm$^3$ at 15° C., a research octane number which is generally between 75 and 90.

Any other hydrocarbon feed which has the following composition by weight can be used: 40% to 80% of paraffins, 0.5% to 7% of cyclic hydrocarbons and 6% of 45% of aromatics, and by a maximum distillation temperature of between 7° C. and 90° C., preferably 77° C. to 83° C.

The composition by weight of the $C_5$–$C_6$ cut which normally comes from a straight run can vary. It depends on the nature of the untreated crude when the $C_5$–$C_6$ cut is a straight run product.

Nevertheless, the cut is defined by a paraffin content which is generally greater than 90% by weight, a cyclic hydrocarbon content which is generally less than 10% by weight and a benzene content which is generally less than 1.5% by weight. The research octane number is generally between 60 and 75.

The cut may also contain very small quantities of compounds containing 4 carbon atoms per molecule (generally less than 0.5% by weight).

As indicated above, the "light reformate fraction" feed can be sent to the hydrogenation zone together with at least a portion of the $C_5$–$C_6$ cut. In this instance, the $C_5$–$C_6$ cut content in the feed entering the hydrogenation zone is between 10% and 90% by weight, preferably between 15% and 55% by weight. Preferably, however, the whole of the $C_5$–$C_6$ cut is mixed with the effluent from the hydrogenation step at the inlet to the isomerisation zone, the hydrogenation zone being practically entirely fed by the light reformate: the $C_5$–$C_6$ cut content of the feed entering the isomerisation zone is between 10% and 90% by weight, preferably between 15% and 55% by weight with respect to the mixture of hydrogenation effluent and $C_5$–$C_6$ cut.

It is also possible to send a portion of the $C_5$–$C_6$ cut to the hydrogenation zone together with the light reformate and a further portion of the cut to the isomerisation zone with the hydrogenation zone effluent.

Regardless of the feed used, the pressure required for the hydrogenation step is generally between 1 and 60 bars absolute, in particular between 2 and 50 bar, and advantageously between 5 and 45 bar. The operating temperature of the hydrogenation zone is generally between 100° C. and 400° C., more advantageously between 150° C. and 350° C. and preferably between 160° C. and 320° C. The space velocity in this zone, calculated with reference to the catalyst, is generally between 1 and 50, more particularly between 1 and 30 $h^{-1}$ (volume of feed per volume of catalyst per hour). The hydrogen flow rate in the zone, with respect to the catalyst, is generally between 1 and 2000 volumes (gas under normal conditions) per volume of catalyst per hour. The hydrogen/hydrocarbon molar ratio in the feed is between 0.5 and 10, preferably between 1 and 3.

Advantageously, the heat evolved in the hydrogenation step is used to preheat the isomerisation feed.

The catalyst used in the hydrogenation zone in accordance with the process of the present invention comprises at least one metal M selected from the group formed by nickel, platinum and palladium, used as it is or, preferably, deposited on a support. At least 50% of the total weight of metal M is in its reduced form. Preferably, nickel or platinum is used, more preferably platinum.

When platinum or palladium is used, the catalyst can advantageously contain at least one halogen in a proportion by weight with respect to the catalyst of between 0.5 and 2%. Preferably, chlorine or fluorine is used or a combination of the two in a proportion of 0.5% to 1.5% by weight with respect to the total weight of the catalyst.

When nickel is used, the proportion of metal M used with respect to the total catalyst weight is between 0.1% and 60%, more particularly between 5% and 60%, and preferably between 5% and 30%. When platinum and/or palladium is used, the total proportion of metal M with respect to the total catalyst weight is between 0.1% and 10%, preferably between 0.05% and 5%.

The support is generally selected from the group formed by alumina, aluminosilicate, silica, zeolites, activated carbon, clays and alumina cements. Alumina is preferably used, with a specific surface area of at least 50 $m^2/g$ and a pore volume of at least 0.4 $cm^3/g$, for example a specific surface area of between 50 and 350 $m^2/g$ and a pore volume of between 0.4 and 1.2 $cm^3/g$.

The effluent from the hydrogenation zone generally contains less than 0.1% of aromatics and generally has an octane number which is 4 to 6 points lower than the feed entering said zone.

The isomerisation zone is supplied with effluent from the hydrogenation zone comprising the mixture of hydrogenated light reformate and hydrogenated $C_5$–$C_6$, or by a mixture of hydrogenated light reformate and unhydrogenated $C_5$–$C_6$ cut, or by a mixture of hydrogenated light reformate and hydrogenated $C_5$–$C_6$ cut with unhydrogenated $C_5$–$C_6$ cut. A chlorine containing compound such as carbon tetrachloride or perchloroethylene, is generally added to the isomerisation feed, such that the chlorine content in the feed is between 50 and 5000 ppm, preferably between 100 and 1000 ppm, Isomerisation is generally carried out in the isomerisation zone under the following conditions: a temperature of between 100° C. and 300° C., preferably between 120° C. and 250° C., and a partial pressure of hydrogen of between atmospheric pressure and 70 bar, preferably between 5 and 50 bar. The space velocity is between 0.2 and 10 liters, preferably between 0.5 and 5 liters of liquid hydrocarbon per liter of catalyst per hour. The hydrogen hydrocarbon molar ratio at the reactor inlet is such that the hydrogen/hydrocarbon molar ratio in the effluent is greater than 0.06, preferably between 0.06 and 10.

The isomerisation catalyst used in the present invention is a characteristic of the invention and comprises at least one halogen, preferably chlorine, and at least one group VIII metal deposited on a support constituted by a mixture of specific proportions of eta alumina and gamma alumina. This means that the support is constituted by eta alumina and gamma alumina, the eta alumina content being between 85% and 95% by weight with respect to the support, preferably between 88% and 92% by weight, and more preferably between 89% and 91% by weight. The complement to 100% of support is constituted by gamma alumina. The group VIII metal is preferably platinum, palladium or nickel.

The eta alumina used in the present invention generally has a specific surface area of between 400 and 600 $m^2/g$, preferably between 420 and 550 $m^2/g$, and a total pore volume which is generally between 0.3 and 0.5 cc/g, preferably between 0.35 and 0.45 cc/g.

The gamma alumina used in the present invention generally has a specific surface area of between 150 and 300 $m^2/g$, preferably between 180 and 250 $m^2/g$, and a total pore volume which is generally between 0.4 and 0.8 cc/g, preferably between 0.45 and 0.7 cc/g.

The two types of alumina are mixed and formed in the proportions defined above, using any technique which is known to the skilled person, for example extrusion through a die, pelletizing or coating.

The support is preferably obtained by mixing at least one hydrated precursor of eta alumina, for example bayerite, and at least one hydrated gamma alumina precursor, for example boehmite, in the above proportions by weight. The mixture obtained may be acidified, using nitric acid for example, then formed as described above.

The desired finished proportion of eta alumina can be obtained by mixing calcined alumina and at least one precursor as described above, in any proportion. Similarly, the desired finished proportion of gamma alumina can be obtained by mixing calcined gamma alumina and at least one precursor as described above, in any proportion (retaining the finished proportions indicated above between the gamma alumina and eta alumina).

The support obtained generally has a specific surface area of between 300 and 550 $m^2/g$, preferably between 350 and 500 $m^2/g$, and a pore volume generally between 0.3 and 0.6 cc/g, preferably between 0.35 and 0.5 cc/g.

At least one hydrogenating metal from group VIII, preferably selected from the group formed by platinum, palladium and nickel, is then deposited on the support using any technique which is known to the skilled person, for example anion exchange using hexachloroplatinic acid in the case of platinum, or palladium chloride in the case of palladium.

When platinum or palladium is used, the concentration is between 0.05% and 1% by weight, preferably between 0.1% and 0.6% by weight. When nickel is used, the concentration is between 0.1% and 10% by weight, preferably between 0.2% and 5% by weight.

The catalyst thus prepared can be reduced in hydrogen then halogenated, in particular chlorinated, using any halogen compound more particularly a chlorine compound, which is known to the skilled person, such as carbon tetrachloride or perchloroethylene. The chlorine content in the finished catalyst is preferably between 5% and 15% by weight, more preferably between 6% and 11% by weight. This catalyst chlorination treatment can either be carried out directly in the unit before injection of the feed (in situ), or offsite.

Chlorination can also be carried out prior to reducing the catalyst in hydrogen.

The effluent obtained at the isomerisation zone outlet has an octane number which is high enough for it to be incorporated into petrol fractions after stabilisation, and it is practically completely free of benzene (maximum benzene content gradually 0.1% by weight).

BRIEF DESCRIPTION OF DRAWING

The single FIGURE is a schematic flowsheet showing an arrangement of the process of the invention, in which hydrogenation and isomerisation are carried out in two separate reactors (or units).

DETAILED DESCRIPTION OF DRAWING

Stabilised reformate (1), is sent to distillation column (6), from which a heavy bottoms product (3) is recovered which can be directly used in petrol fractions, and a light reformate (2) is recovered overhead. This latter is sent to hydrogenation unit (7), after mixing with a portion (9) of a $C_5$–$C_6$ straight run cut introduced via (11). At least one chlorine compound as defined above is introduced to effluent (4), obtained after mixing the hydrogenation effluent and the other portion (10) of the $C_5$–$C_6$ cut. The chlorinated mixture is treated in an isomerisation unit (8) to give the finished product (5) which, after stabilisation (12), can be incorporated into petrol fractions via line (13).

The following examples illustrate the invention without limiting its scope. In these examples, the hydrogenation and isomerisation reactions were carried out in two separate reactors (or units).

EXAMPLE 1 (in accordance with the invention)

A light reformate obtained after distillation at 80° C., containing 21.5% of benzene and with an octane number of 80.3, was mixed in a proportion of 50% by weight with a $C_5$–$C_6$ straight run cut containing 0.7% of benzene and with an octane number of 65. The compositions of the two products are shown in Table 1. The light reformate contained 21.5% of aromatics, 4% of cyclic hydrocarbons and 74.5% of paraffins. The $C_5$–$C_6$ cut contained 0.7% of benzene, 7.25% of cyclic hydrocarbons and 92.05% of paraffins. The mixed feed, with the composition shown in Table 1, was sent to a hydrogenation unit at a temperature of 110° C. and at a pressure of 40 bar. The hydrogen/hydrocarbon molar ratio of the feed was 0.85 and the liquid space velocity was 4 $h^{-1}$. The catalyst used in the hydrogenation section was constituted by 15% of Ni deposited on alumina.

The effluent from the hydrogenation unit, with the detailed composition given in Table 1, was free of benzene but had an octane number of 70.9. It was then sent, after adding 500 ppm of $CCl_4$, to an isomerisation unit operating at a temperature of 170° C., a pressure of 30 bar and a space velocity of 2 liters of liquid hydrocarbon per liter of catalyst per hour. The $H_2$/hydrocarbon molar ration at the inlet was such that this same ratio was 0.07 in the effluent. The catalyst used in the isomerisation unit was composed of 0.3% by weight of Pt deposited on a support constituted by 90% by weight of eta alumina and 10% by weight of gamma alumina. This catalyst was then chlorinated to 9% by weight of Cl. The effluent from the isomerisation unit had the composition given in Table 1. It was practically free of benzene and had an octane number of 81.5. It could then be incorporated directly into petrol fractions after stabilisation.

TABLE 1

|  | Reformate | $C_5$–$C_6$ cut from distillation | Hydrogenation feed | Hydrogenation effluent | Isomerisation effluent |
| --- | --- | --- | --- | --- | --- |
| Lights | 6.5 | 1.0 | 3.7 | 3.7 | 6.0 |
| $iC_5$ | 9.9 | 18.9 | 14.4 | 14.4 | 23.7 |
| $nC_5$ | 7.1 | 25.4 | 16.25 | 16.25 | 7.4 |
| $22DMC_4$ | 3.0 | 0.4 | 1.7 | 1.7 | 13.2 |
| $23DMC_4$ | 4.1 | 1.85 | 3.0 | 3.0 | 4.9 |
| $2MC_5$ | 15.8 | 11.1 | 13.45 | 13.45 | 16.5 |
| $3MC_5$ | 12.5 | 9.4 | 11.0 | 11.0 | 10.1 |
| $nC_6$ | 12.1 | 19.6 | 15.9 | 15.9 | 6.7 |
| $C_7$ | 3.5 | 4.4 | 3.9 | 3.9 | 3.0 |
| $CC_5$ | 0.4 | 1.4 | 0.9 | 0.9 | 0.5 |
| $MCC_5$ | 3.6 | 4.1 | 3.85 | 3.85 | 4.9 |
| $CC_6$ | 0 | 1.75 | 0.85 | 11.95 | 3.1 |
| Benzene | 21.5 | 0.7 | 11.1 | — | — |
| RON | 80.3 | 65 | 72.9 | 70.9 | 81.5 |

EXAMPLE 2 (in accordance with the invention)

Six catalysts were prepared with references A to F, composed of 0.3% of Pt deposited on a support comprising a mixture of eta alumina and gamma alumina, the eta alumina content of the support being varied from 85% to 95% as shown in Table 2. The catalysts thus defined were chlorinated to 9% by weight of chlorine. The effluent at the outlet of the hydrogenation unit, with the composition shown in Table 1, was sent to an isomerisation unit operating under the conditions described for Example 1. the RON obtained after isomerisation are shown in Table 2. It can be seen that the maximum RON was obtained when the eta alumina content in the support was between 89% and 91%.

TABLE 2

|  | A | B | C | D | E | F |
|---|---|---|---|---|---|---|
| η Al$_2$O$_3$ content in support (%) | 85 | 88 | 89 | 91 | 92 | 95 |
| RON after isomerisation | 81 | 81.2 | 81.5 | 81.5 | 81.2 | 81 |

EXAMPLE 3 (in accordance with the invention)

A light reformate obtained after distillation at 80° C., containing 21.5% of benzene with an octane number of 80.3, with the detailed composition shown in Table 3, contained 21.5% of aromatics, 4% of cyclic hydrocarbons and 74.5% of paraffins. It was sent to a hydrogenation unit at a temperature of 110° C. and at a pressure of 40 bar. The hydrogen/hydrocarbon molar ratio of the feed was 0.85 and the space velocity was 4 h$^{-1}$. The catalyst used in the hydrogenation section was constituted by 15% of Ni deposited on alumina.

The effluent from the hydrogenation unit, with the detailed composition given in Table 3, was free of benzene but had an octane number of 76.5. It was then mixed with 50% by weight of a straight run C$_5$–C$_6$ cut containing 0.7% of benzene, 92.05% of paraffins and 7.25% of cyclic hydrocarbons with an octane number of 65. The composition of the cut and the composition of the mixture constituting the feed to the isomerisation unit are given in Table 3.

The isomerisation unit operated under the same conditions as those described for Example 1, with an identical catalyst.

The effluent from the isomerisation unit had the composition given in Table 3; It was free of benzene and had an octane number of 81.5. it could then be incorporated directly into petrol fractions after stabilisation.

TABLE 3

|  | Reformate | C$_5$–C$_6$ cut from distillation | Hydrogenation feed | Hydrogenation effluent | Isomerisation effluent |
|---|---|---|---|---|---|
| Lights | 6.5 | 1.0 | 6.5 | 3.7 | 6.0 |
| iC$_5$ | 9.9 | 18.9 | 9.9 | 14.4 | 23.7 |
| nC$_5$ | 7.1 | 25.4 | 7.1 | 16.25 | 7.4 |
| 22DMC$_4$ | 3.0 | 0.4 | 3.0 | 1.7 | 13.2 |
| 23DMC$_4$ | 4.1 | 1.85 | 4.1 | 3.0 | 4.9 |
| 2MC$_5$ | 15.8 | 11.1 | 15.8 | 13.45 | 16.5 |
| 3MC$_5$ | 12.5 | 9.4 | 12.5 | 11.0 | 10.1 |
| nC$_6$ | 12.1 | 19.6 | 12.1 | 15.9 | 6.7 |
| C$_7$ | 3.5 | 4.4 | 3.5 | 3.9 | 3.0 |
| CC$_5$ | 0.4 | 1.4 | 0.4 | 0.9 | 0.5 |
| MCC$_5$ | 3.6 | 4.1 | 3.6 | 3.85 | 4.9 |
| CC$_6$ | 0 | 1.75 | 21.5 | 11.60 | 3.1 |
| Benzene | 21.5 | 0.7 | — | .35 | — |
| RON | 80.3 | 65 | 76.5 | 71.2 | 81.5 |

EXAMPLE 4 (in accordance with the invention)

The present Example differed from Example 1 only in that the chlorine content of the catalyst used in the isomerisation unit was 7% by weight.

The effluent from the isomerisation unit had the composition given in Table 4. It contained practically no benzene and had an octane number of 80.3. It could thus be directly incorporated into petrol fractions after stabilisation.

TABLE 4

|  | Reformate | C$_5$–C$_6$ cut from distillation | Hydrogenation feed | Hydrogenation effluent | Isomerisation effluent |
|---|---|---|---|---|---|
| Lights | 6.5 | 1.0 | 3.7 | 3.7 | 6.0 |
| iC$_5$ | 9.9 | 19.9 | 14.4 | 14.4 | 22.2 |
| nC$_5$ | 7.1 | 25.4 | 16.25 | 16.25 | 8.9 |
| 22DMC$_4$ | 3.0 | 0.4 | 1.7 | 1.7 | 12.7 |
| 23DMC$_4$ | 4.1 | 1.85 | 3.0 | 3.0 | 4.5 |
| 2MC$_5$ | 15.8 | 11.1 | 13.45 | 13.45 | 16.5 |
| 3MC$_5$ | 12.5 | 9.4 | 11.0 | 11.0 | 10.1 |
| nC$_6$ | 12.1 | 19.6 | 15.9 | 15.9 | 7.6 |
| C$_7$ | 3.5 | 4.4 | 3.9 | 3.9 | 3.0 |
| CC$_5$ | 0.4 | 1.4 | 0.9 | 0.9 | 0.5 |
| MCC$_5$ | 3.6 | 4.1 | 3.85 | 3.85 | 4.9 |
| CC$_6$ | 0 | 1.75 | 0.85 | 11.95 | 3.1 |
| Benzene | 21.5 | 0.7 | 11.1 | — | — |
| RON | 80.3 | 65 | 72.9 | 70.9 | 80.3 |

EXAMPLE 5 (comparative)

Example 5 differed from Example 4 only in that the catalyst used in the isomerisation zone (always composed of 0.3% by weight of Pt) had a support constituted by 50% by weight of eta alumina and 50% by weight of gamma alumina.

The catalyst thus defined was then chlorinated. The finished chlorine content was 7% by weight.

Table 5 gives the composition of the effluent leaving the isomerisation unit.

TABLE 5

|  | Reformate | $C_5$–$C_6$ cut from distillation | Hydrogenation feed | Hydrogenation effluent | Isomerisation effluent |
|---|---|---|---|---|---|
| Lights | 6.5 | 1.0 | 3.7 | 3.7 | 5.5 |
| $iC_5$ | 9.9 | 18.9 | 14.4 | 14.4 | 18.4 |
| $nC_5$ | 7.1 | 25.4 | 16.25 | 16.25 | 12.3 |
| $22DMC_4$ | 3.0 | 0.4 | 1.7 | 1.7 | 10.3 |
| $23DMC_4$ | 4.1 | 1.85 | 3.0 | 3.0 | 3.9 |
| $2MC_5$ | 15.8 | 11.1 | 13.45 | 13.45 | 12.9 |
| $3MC_5$ | 12.6 | 9.4 | 11.0 | 11.0 | 7.9 |
| $nC_6$ | 12.1 | 19.6 | 15.9 | 15.9 | 15.0 |
| $C_7$ | 3.5 | 4.4 | 3.9 | 3.9 | 3 |
| $CC_5$ | 0.4 | 1.4 | 0.9 | 0.9 | 0.5 |
| $MCC_5$ | 3.6 | 4.1 | 3.85 | 3.85 | 5.2 |
| $CC_6$ | 0 | 1.75 | 0.85 | 11.95 | 5.1 |
| Benzene | 21.5 | 0.7 | 11.1 | — | — |
| RON | 80.3 | 65 | 72.9 | 70.9 | 74.8 |

The RON gain between the isomerisation feed, i.e., the hydrogenation effluent, and the isomerisation effluent is very low.

The octane number (RON) fell with respect to the light reformate.

Note: in the Tables above:
$22DMC_4$=2,2-dimethylbutane
$23DMC_4$=2,3-dimethylbutane
$2MC_5$=2-methylpentane
$3MC_5$=3-methylpentane
$CC_5$=cyclopentane
$MCC_5$=methyl cyclopentane
$CC_6$=cyclohexane

We claim:

1. A process for reducing the benzene content in petrol fractions comprising hydrogenating in a hydrogenation zone at least one hydrogenation feed having a composition, by weight, of 40% to 80% of paraffins, 0.5% to 7% of non-aromatic cyclic hydrocarbons and 6% to 45% of aromatics, and having a maximum distillation temperature of 70° C. to 90° C. to obtain a hydrogenation effluent, mixing said hydrogenation effluent with a $C_5$–$C_6$ cut having a paraffin content of more than 90% by weight, a non-aromatic cyclic hydrocarbon content of less than 10% by weight and a benzene content of less than 1.5% by weight, to form an isomerization feed, and isomerizing said isomerization feed in an isomerization zone, the process being characterized in that an isomerization catalyst is used during the isomerization reaction which contains at least one halogen and at least one metal from group VIII on a support, said support consisting essentially of a mixture of eta alumina and gamma alumina, the eta alumina content being between 85% and 95% by weight with respect to the support, and the complement to 100% of the support being gamma alumina.

2. A process according to claim 1, wherein the eta alumina content of the isomerization catalyst is between 88% and 92% by weight.

3. A process according to claim 2 wherein the eta alumina content of the support is between 89% and 91% by weight.

4. A process according to claim 1, wherein the eta alumina has a specific surface area of between 400 and 600 $m^2/g$ and a pore volume of between 0.3 and 0.5 cc/g; and the gamma alumina has a specific surface area between 150 and 300 $m^2/g$ and a pore volume between 0.4 and 0.8 cc/g.

5. A process according to claim 1, wherein the isomerization catalyst has a chlorine content of between 5% and 15% by weight.

6. A process according to claim 1, wherein the group VIII metal in the isomerization catalyst is selected from the group consisting of platinum, palladium and nickel.

7. A process according to claim 1, wherein said isomerisation feed contains 10% to 90% by weight of said $C_5$–$C_6$ cut, based on the mixture of the hydrogenation effluent and the $C_5$–$C_6$ cut.

8. A process according to claim 1, wherein the whole of the $C_5$–$C_6$ cut is mixed with the hydrogenation effluent.

9. A process according to claim 1, wherein the hydrogenation is conducted with a catalyst containing at least one metal selected from the group consisting of nickel, platinum and palladium.

10. A process according to claim 1 wherein the $C_5$–$C_6$ cut is a straight run cut.

* * * * *